United States Patent [19]

Chagnon

[11] Patent Number: 5,477,937
[45] Date of Patent: Dec. 26, 1995

[54] STEERABLE TRAILER

[76] Inventor: Florent Chagnon, 2133 rue Principale, St. Dominique, Quebec, Canada, J0H 1L0

[21] Appl. No.: 262,437

[22] Filed: Jun. 20, 1994

[51] Int. Cl.[6] .................................. B62D 61/10
[52] U.S. Cl. ...................... 180/24.01; 280/81.6
[58] Field of Search ................ 280/81.6; 180/24.01

[56] References Cited

U.S. PATENT DOCUMENTS

| | | | |
|---|---|---|---|
| 2,643,895 | 6/1953 | Stover | 280/81.6 |
| 2,848,244 | 8/1958 | Georgi | 280/81.6 |
| 4,186,814 | 2/1980 | Hart | 180/24.01 |

FOREIGN PATENT DOCUMENTS

| | | | |
|---|---|---|---|
| 1005848 | 4/1957 | Germany | 280/81.6 |
| 2032158 | 1/1972 | Germany | 280/81.6 |

*Primary Examiner*—Eric D. Culbreth
*Attorney, Agent, or Firm*—Eric Fincham

[57] ABSTRACT

The present invention relates to steering arrangements for trailers and particularly to a four wheel dolly system wherein a pair of wheels on one side of the dolly can move vertically with respect to each other to maintain constant ground contact even while going over rough terrain. The arrangement includes a steering control arm which is transversely moveable along a shaft and is also rotatably moveable with respect thereto, A pair of dollies may be provided whereby the rear wheels of the trailer follow the same track as the front wheels.

9 Claims, 8 Drawing Sheets

5,477,937

1

STEERABLE TRAILER

FIELD OF THE INVENTION

The present invention relates to a trailer assembly and more particularly relates to a four wheel dolly steering arrangement suitable for a trailer.

The use of trailers in a number of different manners is well known in the art. For example, trailers are widely used in the trucking industry for the transport of all types of goods and as such, relatively standardized arrangements are employed. However, there are also more specialized demands for trailers such as for transporting either very bulky or very heavy equipment. Also, trailers employed, for example, on the farm must frequently traverse soft fields while carrying equipment.

Disadvantages of conventional trailers is that the rear of the trailer will not follow the same track as the cab or pulling portion and this is a disadvantage when, for example, extremely long loads are being pulled and/or when it is required that the trailer follow the same track as the pulling unit such as is frequently the case in farming where the wheels must follow a desired track between rows or the like.

Various proposals have been advanced in the art including the use of a self-steering dolly. However, the control means for such self-steering dollies have not permitted the use of such dollies on irregular or rough terrain.

SUMMARY OF THE INVENTION

It is an object of the present invention to provide a trailer which is suitable for carrying large and/or heavy loads.

It is a further object of the present invention to provide a trailer dolly of the four wheel type wherein the dolly is steerable to follow a desired track.

It is a further object of the present invention to provide a four wheel dolly suitable for a trailer wherein the wheels are adapted to ride over relatively rough terrain.

It is a further object of the present invention to provide a trailer assembly wherein both the front and the back of the trailer utilize a steerable dolly.

According to one aspect of the present invention, there is provided a dolly steering assembly which has a pair of opposed front wheels and a pair of opposed rear wheels with a frame means interconnecting the front and rear wheels. Associated with the frame is a transversely extending shaft. Each wheel has steerage linkage means operatively associated therewith and there is at least one steering control arm associated with each set of a front wheel and a rear wheel. The first end of the control arm is operatively connected to the steering linkage to turn a set of wheels with the second end of the control arm being both slidably and rotatably mounted on the transversely extending shaft. This permits the control arm to move transversely along the shaft to turn the wheels and also permits rotatable movement thereof to allow relative vertical movement between the front and rear wheels of each set of wheels.

In a further aspect of the invention, there is provided a dolly steering assembly which includes a left front wheel, a right front wheel, a rear left wheel, and a rear right wheel. Each wheel is rotatably mounted on a spindle with the spindles being mounted on a dolly frame interconnecting the wheels. The wheels each have a steerage linkage means operatively associated therewith for turning the wheels. A first connecting member extends between the steering linkage means of the left wheels and a second connecting member extends between the linkage means of the right wheels with the connecting members each being pivotably connected to the frame. A steering control arm associated with each connecting member is in turn pivotably connected with respect to each of the connecting members to cause the connecting members to move pivotably and thereby control the steering of the wheels.

In a further aspect of the present invention, there is provided a trailer having a front dolly and a rear dolly steering system, frame means interconnecting the front and rear dollies, each of the dollies having a pair of opposed front rotatably mounted wheels, a pair of opposed rear rotatably mounted wheels, a sub-frame interconnecting the front and rear wheels, the sub-frame being pivotably mounted to the trailer frame, a transversely extending shaft associated with the sub-frame, steering linkage means operatively associated with each wheel and at least one steering control arm associated with each set of wheels comprising a front wheel and a rear wheel. The steering control arm is operatively connected to the steering linkage means to turn each set of wheels. Means interconnect the front and rear dollies such that the control arms of one of the dollies are actuated in response to movement of the control arms of the other of the dollies.

In greater detail, the steering systems of the present invention are directed to a dolly steering system wherein the dolly has at least four wheels. More than one dolly may be utilized for a trailer as will be described in greater detail hereinbelow as well as multiple wheels/axles.

In the embodiment wherein both front and rear dollies are utilized, various interconnecting combinations are possible. Thus, for example, one may have a system wherein the front dolly is controlled manually either directly by the operator or in response to a turning motion by a towing vehicle. The rear dolly could then also be manually controllable or alternatively, may be interconnected to the first dolly and is thereby responsive to the turning movement of the first dolly. Various different types of connections may be employed including a hydraulic interconnection as will be discussed in greater detail with respect to the preferred embodiments.

The dolly steering structure utilizes or assembly utilizes a dolly frame which interconnects the wheels. It will be understood that reference herein will be made to four wheels—a left front, a right front, a left rear and a right rear wheel. These wheels may be in line and/or offset and in addition, double wheels may be employed if so desired. The dolly frame is adapted to support and be attached to the main frame of the trailer.

The dolly frame may be of any desired configuration with a general X-shaped frame being a preferred embodiment. The wheels are mounted on the frame by suitable means— i.e. each wheel is rotatable about an axle or a spindle which in turn is mounted indirectly or directly to the frame. In the preferred embodiment, there is provided a spindle having a first portion about which the wheel is rotatable while the remaining portion of the spindle is rotatably journalled on a portion of the frame. In this embodiment, a first arm would be fixedly secured to the spindle to impart the turning motion thereto when it is desired to turn the wheels.

The dolly frame, while rigid in itself, is mounted so as to be pivotable with respect to the trailer frame. This may be achieved by rotatably journalling the dolly frame with respect to the trailer frame.

A feature of one aspect of the present invention is the use of a steering control arm which is operatively connected to the steering linkage associated with the wheels. The steering control arms (one for each set of wheels on the left and right sides) is operatively connected to the steering linkage such that horizontal movement thereof will drive the steering linkage and wheels to turn in the desired direction. The steering control arm is in turn mounted on a transversely extending shaft and is slidable therealong. However, each steering control arm is also rotatable with respect to the shaft such that the front and rear wheels may move vertically with respect to each other such as would occur when going over rough terrain. The trailer of the present invention may be employed in many different environments; it is particularly well adapted for use in the fields of a farm and for equipment such as taught in co-pending application Ser. No. 08/207, 152 entitled Crop Sprayer System.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
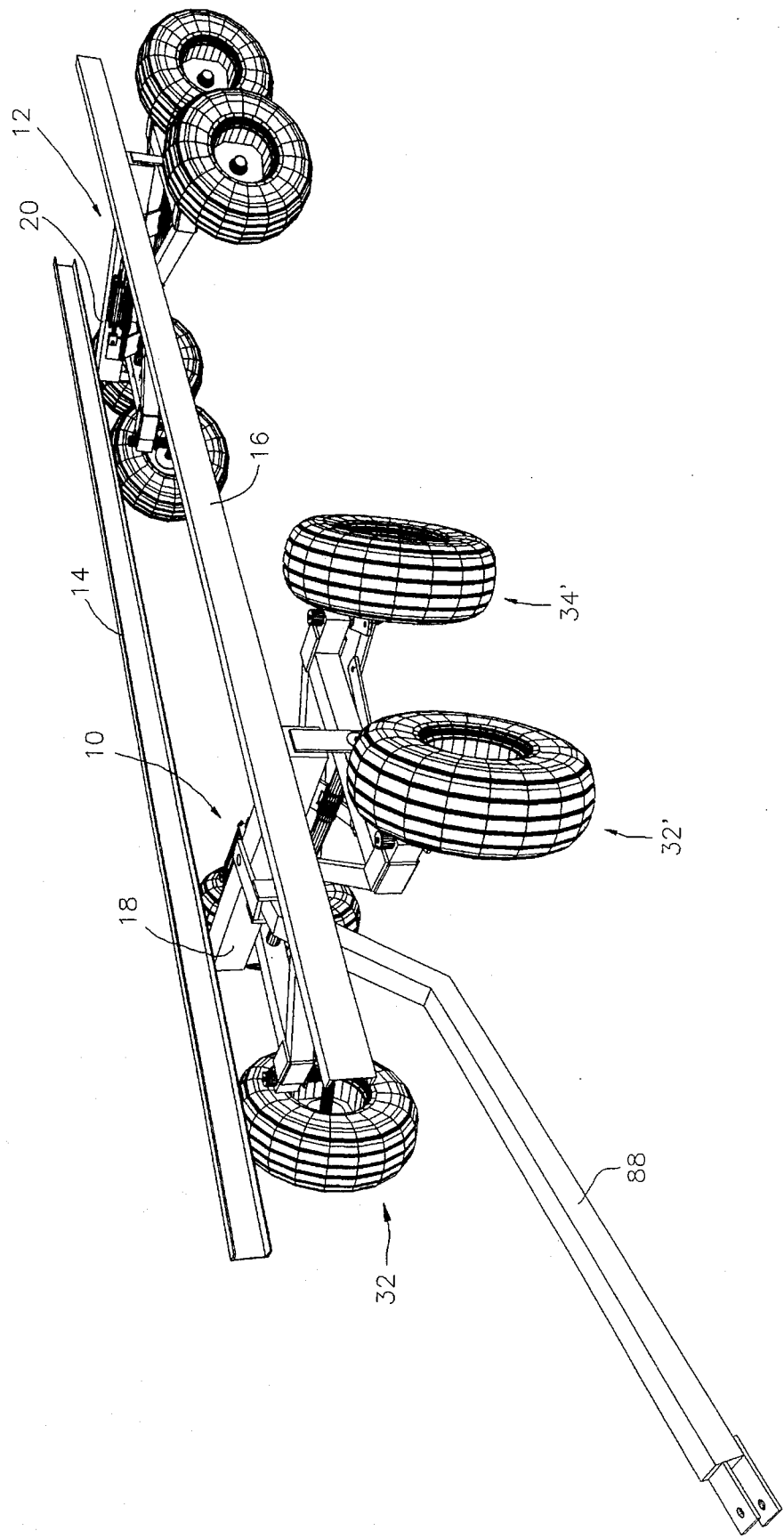
FIG. 1 is a perspective view of a trailer having both a front and rear dolly arrangement.
Figure 2:
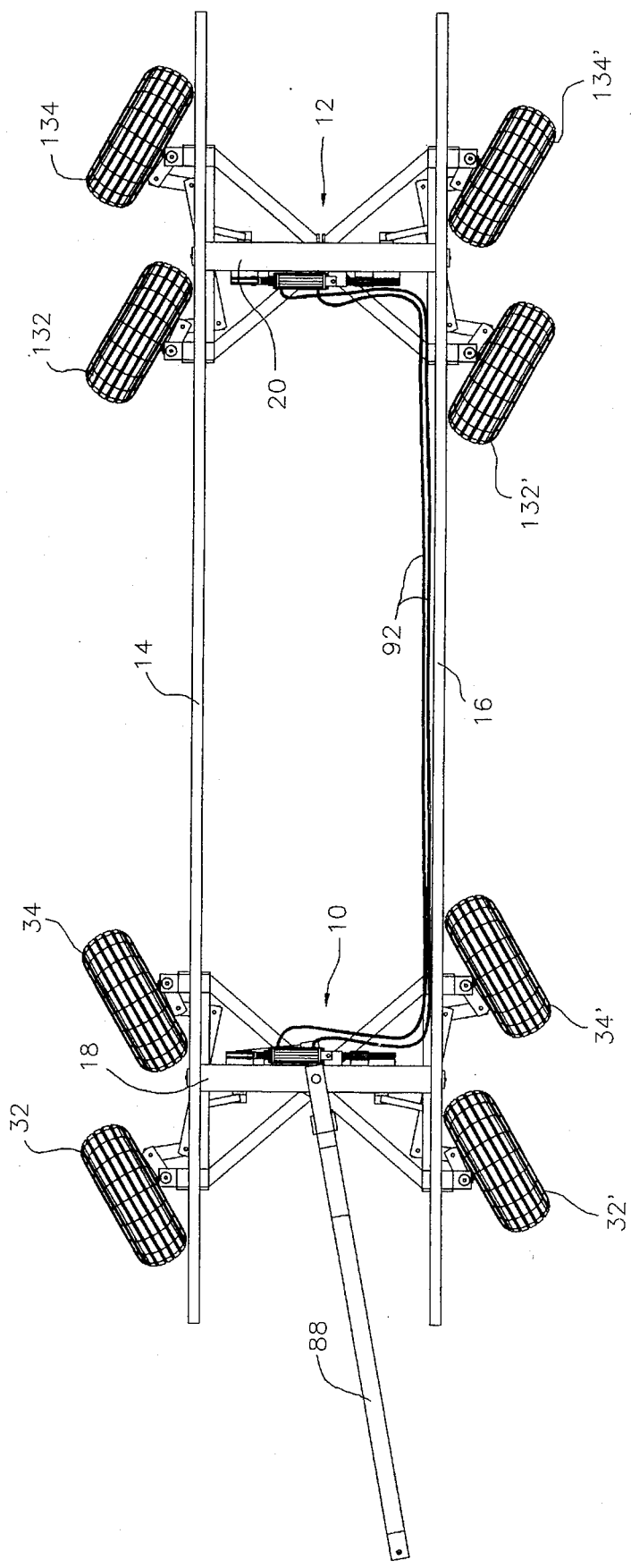
FIG. 2 is a top plan view thereof.

Referring to the drawings in greater detail and by reference characters thereto, the trailer illustrated in the drawings includes a front dolly structure 10 and a rear dolly structure 12. Front and rear dollies 10 and 12 are connected by a frame which includes longitudinally extending beams 14 and 16 and transversely extending beams 18 and 20. Beams 14, 16, 18 and 20 are connected by suitable means such as welding.

Both front dolly 10 and rear dolly 12 are substantially identical with respect to the steering mechanism and thus, only the front dolly 10 will be described in detail herein. Similar components on rear dolly 12 are identified by like reference numerals in the hundreds. As may be seen from FIG. 3, front dolly 10 includes frame members 22, 24, 22' and 24' which form an X shaped frame. A pair of longitudinally extending beams 30 and 30' interconnect frame members 22, 24, and 26, 28 respectively.

Figure 3:
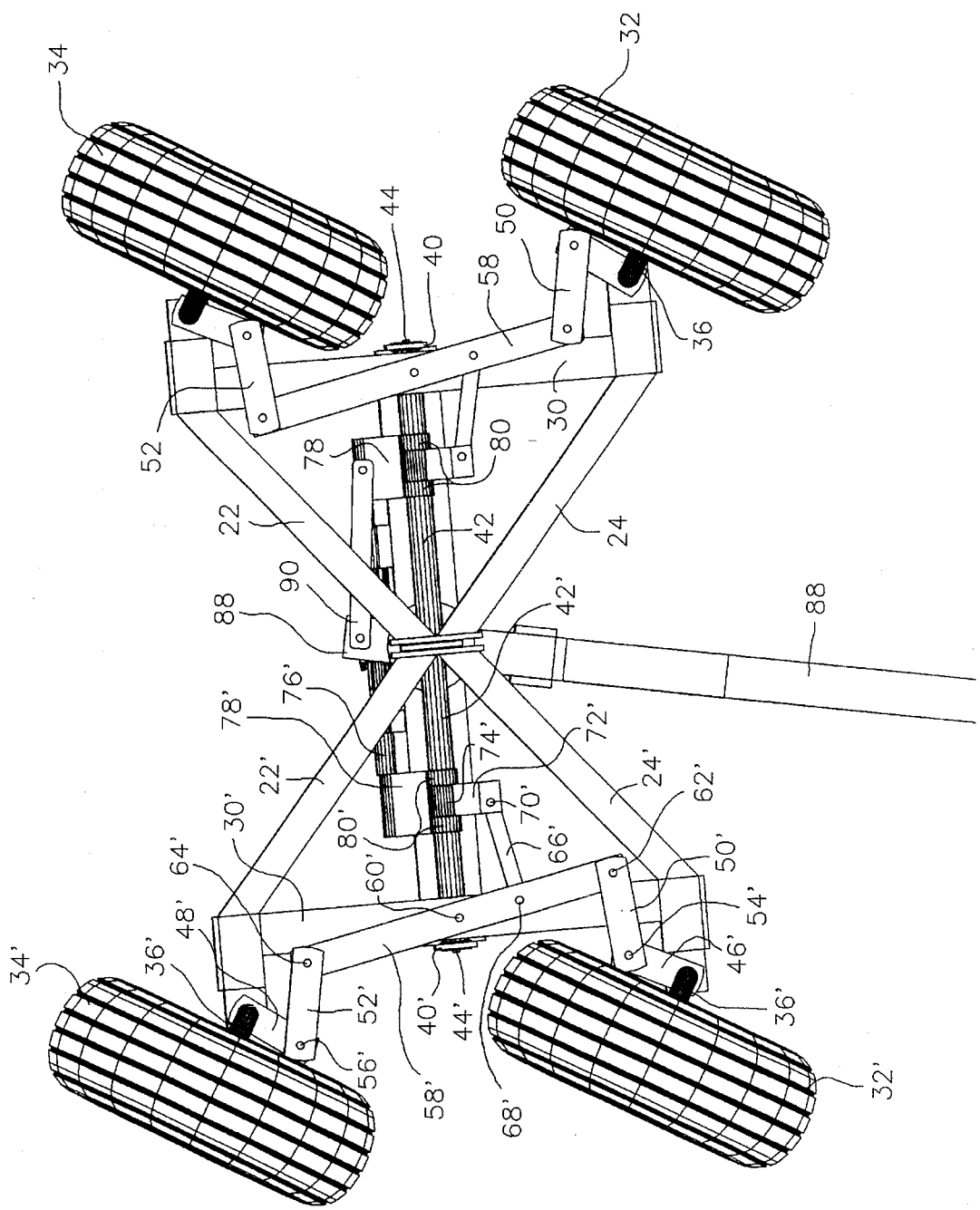
FIG. 3 is a bottom plan view of the front dolly.

Since the steering mechanism is substantially symmetrical, only the right hand side as seen in FIG. 3 will be described in detail; similar reference numerals are used for the left hand side but with a prime (').

Front dolly 10 includes front wheels 32 and 32' and rear wheels 34 and 34'. Each wheel is mounted on an axle or spindle as shown in FIG. 4 wherein spindle 36' has a vertically extending portion 38' associated therewith and which is rotatably journalled within a frame member.

Figure 4:
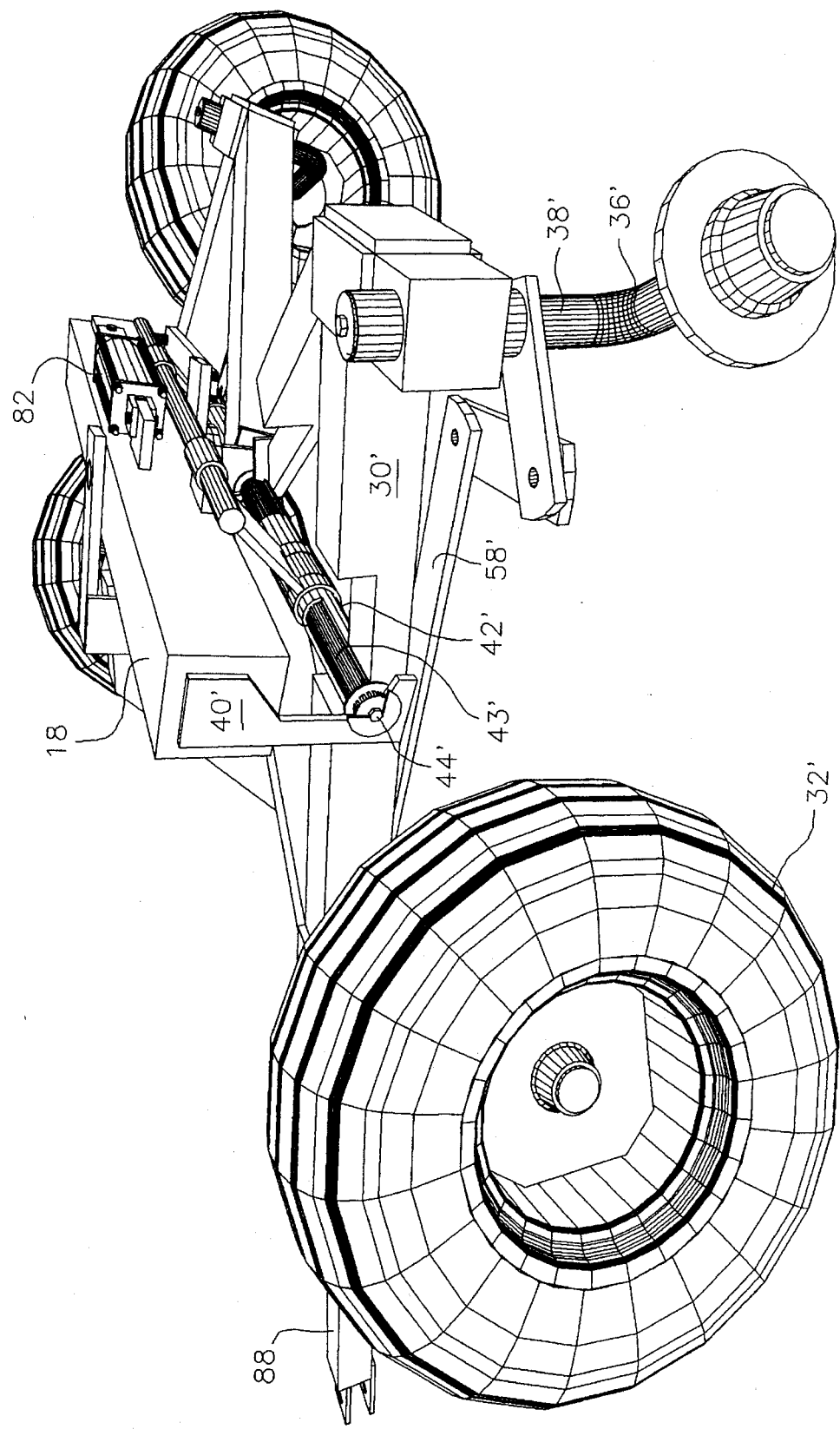
FIG. 4 is a perspective view of the front dolly with one wheel removed and with a portion being partially cut away.

As shown in FIGS. 3 and 4, a transversely extending shaft 42, 42' extends between frame members and is suitable secured thereto. In turn, frame element 40 extends downwardly from transverse beam 18 and is secured to an inner shaft (only shaft 43' shown) as indicated by reference numeral 44 to permit pivotable movement of frame element 30 with respect thereto.

The steering linkage includes wheel control arms 46 and 48 which are connected to vertical portions 38 of their respective spindles 36 and are adapted to turn spindle 36 to thereby impart the desired turning motion to the associated wheel. Forming part of the steering linkage are link arms 50 and 52 which are suitably secured by pins 54 and 56 to wheel control arms 46 and 48 respectively. Interconnecting link arms 50 and 52 is a pivotable connecting arm 58 which is pivotably secured to frame member 30 at point 60. It will be noted that, in turn, both ends of arm 58 are pivotably secured to link arms 50 and 52 at points 62 and 64 respectively.

A steering control arm 66 is pivotably connected at point 68 to connecting arm 58 while at its opposed end, it is connected to element 72 at pivot point 70. Element 72 has a portion 74 thereof which is mounted on shaft 42 in a slidable and rotatable relationship therewith. In other words, portion 74 is rotatable about shaft 42 and is also slidable therealong.

As may be seen, a transversely extending shaft 75 has members 76 and 76' secured thereto and which function to interconnect shafts 42 and 75 by means of members 78. Thus member 78 is attached to shaft 75 at one end while terminating in bushings 80 which are mounted on shaft 42 in a slidable relationship therewith. Bushings 80 are mounted on either side of rotatable element 74 and accordingly, are adapted to guide rotatable element 74 in a slidable relationship with respect to shaft 42.

Figure 5:
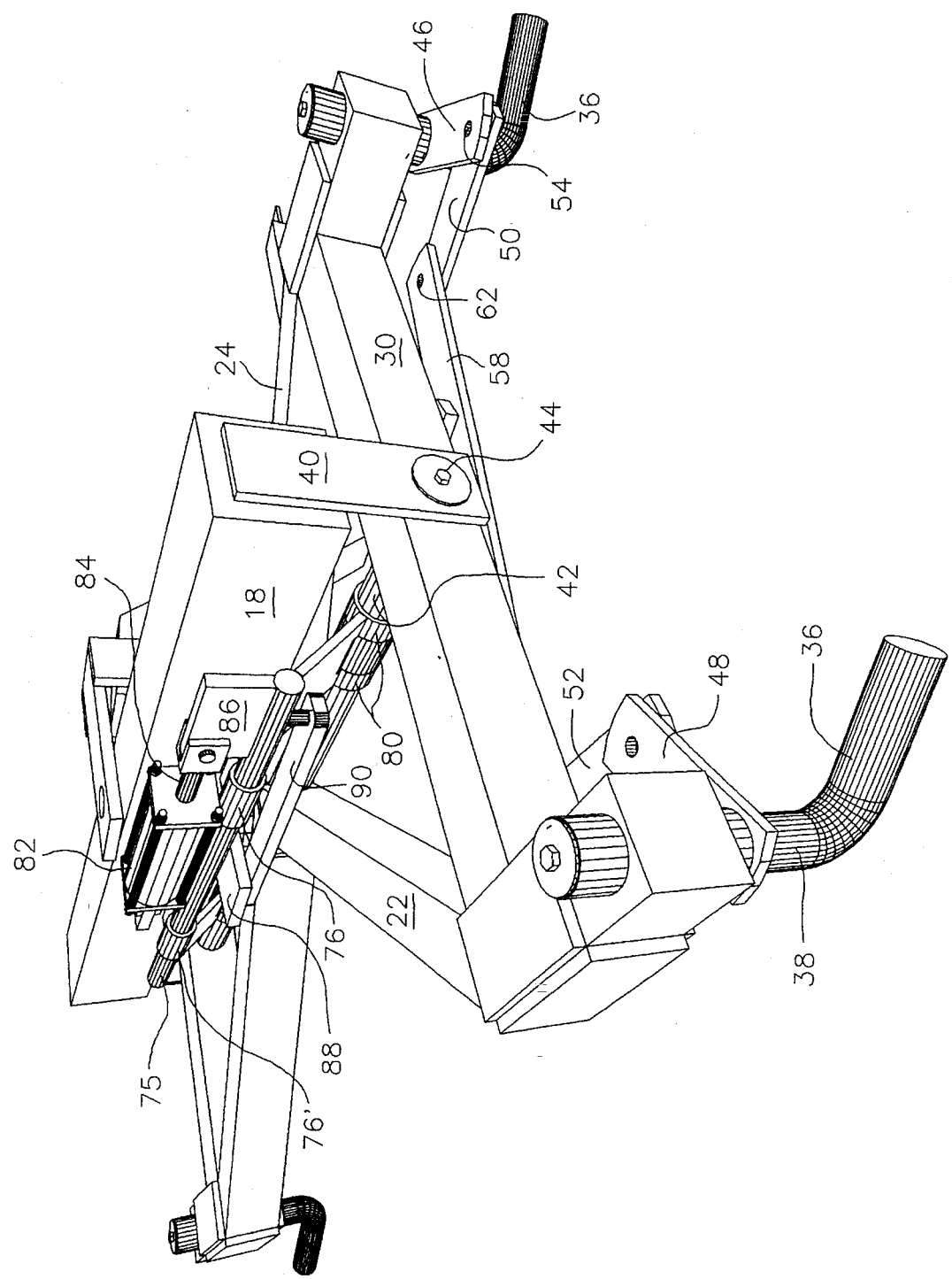
FIG. 5 is a perspective view of the dolly of FIG. 4 with all wheels removed.

As may be seen in FIGS. 4 and 5, a hydraulic cylinder generally designated by reference numeral 82 is mounted on frame member (beam) 18 with arm 84 of cylinder 82 being secured to a plate 86 which in turn is securely attached (welded) to shaft 75.

A towing arm 88 is operatively connected to first dolly structure 10; as shown in FIG. 3, arm 90 extends between towing arm 88 and shaft 75 to drive shaft 75 in a desired direction. This movement is translated to hydraulic cylinder 82 which in turn, through hydraulic lines 92, connects to hydraulic cylinder 182 with rear dolly 12. In an alternative arrangement, hydraulic cylinder 82 may not be operated through towing arm 88; rather, hydraulic cylinder 82 may be activated to impart the desired steering motion to the wheels of front dolly 10.

In operation, towing arm 88 may be operated to impart a lateral motion to connecting shaft 75 through connecting member 90. This in turn, through arm 78, will cause bushings 80 to move in a slidable manner along shaft 42 and in turn, cause portion 72 to move. This motion is translated through steering control arm 66 to pivotable arm 58 and the steering linkage to cause the desired turning of the wheels. In addition, as will be noted from the above description, the whole dolly assembly is pivotable about points 44 and 44' with respect to the main frame such that the dolly may ride over relatively uneven terrain such as may be encountered in fields or the like.

The steering control of both dollies, through hydraulic cylinders 82 and 182, may be linked together and may either be manually controllable from, for example, a towing tractor or the whole operation may be automated. Both hydraulic cylinders 82 and 182 may be linked in a desired manner through suitable hydraulic lines. Furthermore, the operation of hydraulic cylinders 82 and 182 may be controlled from a turning motion imparted to tow arm 88 from the tractor.

Figure 6:
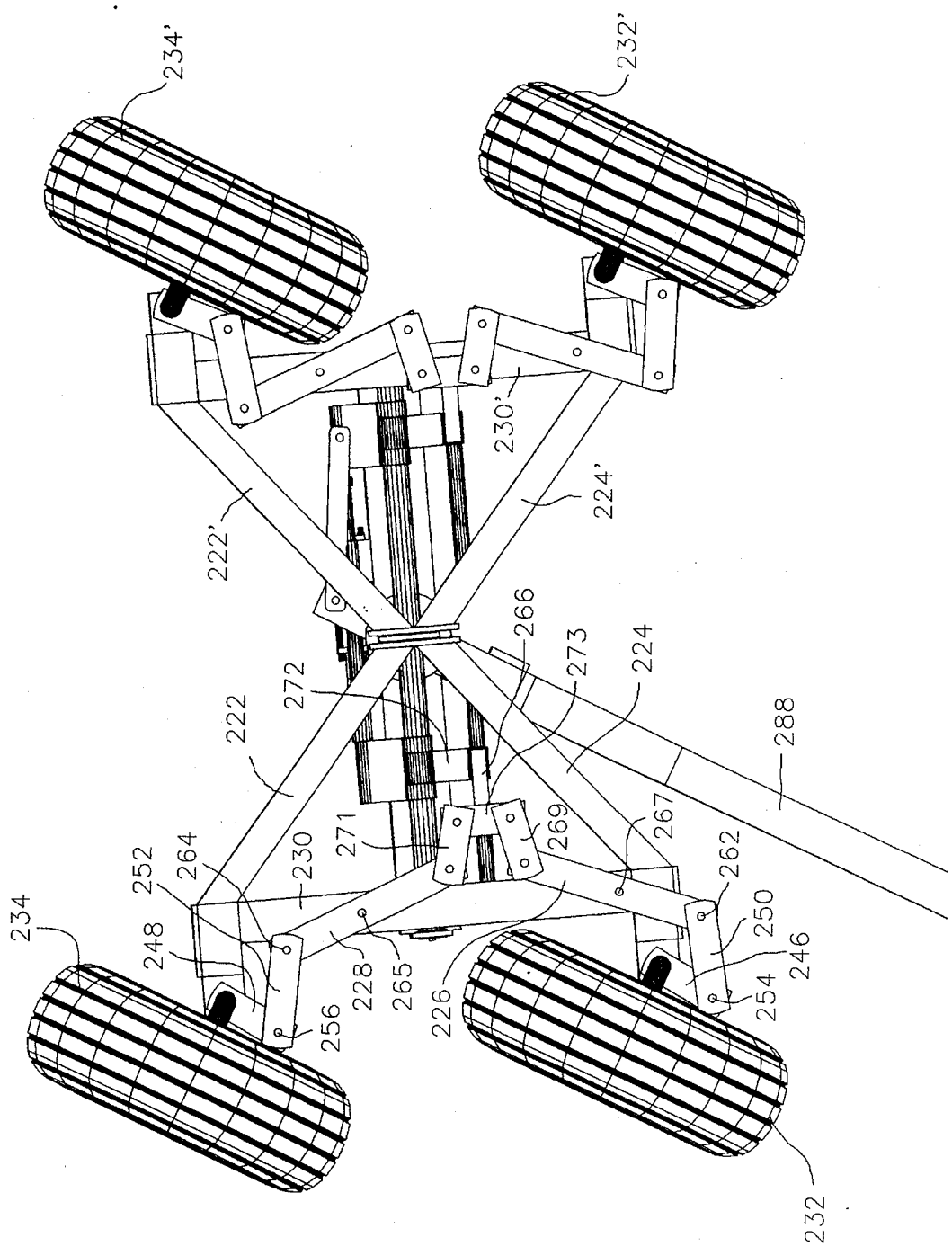
FIG. 6 is a bottom view of a modified steering linkage arrangement.

Referring to FIG. 6, a somewhat modified steering arrangement for a dolly is shown and will now be discussed. Similar components are identified by similar reference numerals in the 200 hundreds.

As may be seen, the dolly includes an X-shaped frame formed of members 222, 224, 222' and 224' with horizontal beams 230 and 230' interconnecting the X-frame. As will be seen, wheel control arms 246 and 248 both extend in the same direction from the spindles and are joined to link arms 250 and 252 by pins 254 and 256 respectively. Instead of a single connecting arm as described in the previous embodiment, a pair of connecting arms 226 and 228 are connected to link arms 250 and 252 respectively by means of pins 262 and 264 respectively. Connecting arm 226 is in turn pivotably connected to frame member 230 at point 267 while connecting arm 228 is also connected to frame member 230 at point 265.

Steering control arm 266 is still connected to element 272; however, the other end of it terminates in a member 273 which is connected to secondary link arms 269 and 271 respectively and which, are in turn, pivotably connected to connecting arms 226 and 228. The operation of the steering assembly is substantially the same as that described above with respect to the embodiments of FIG. 3.

Figure 7A:
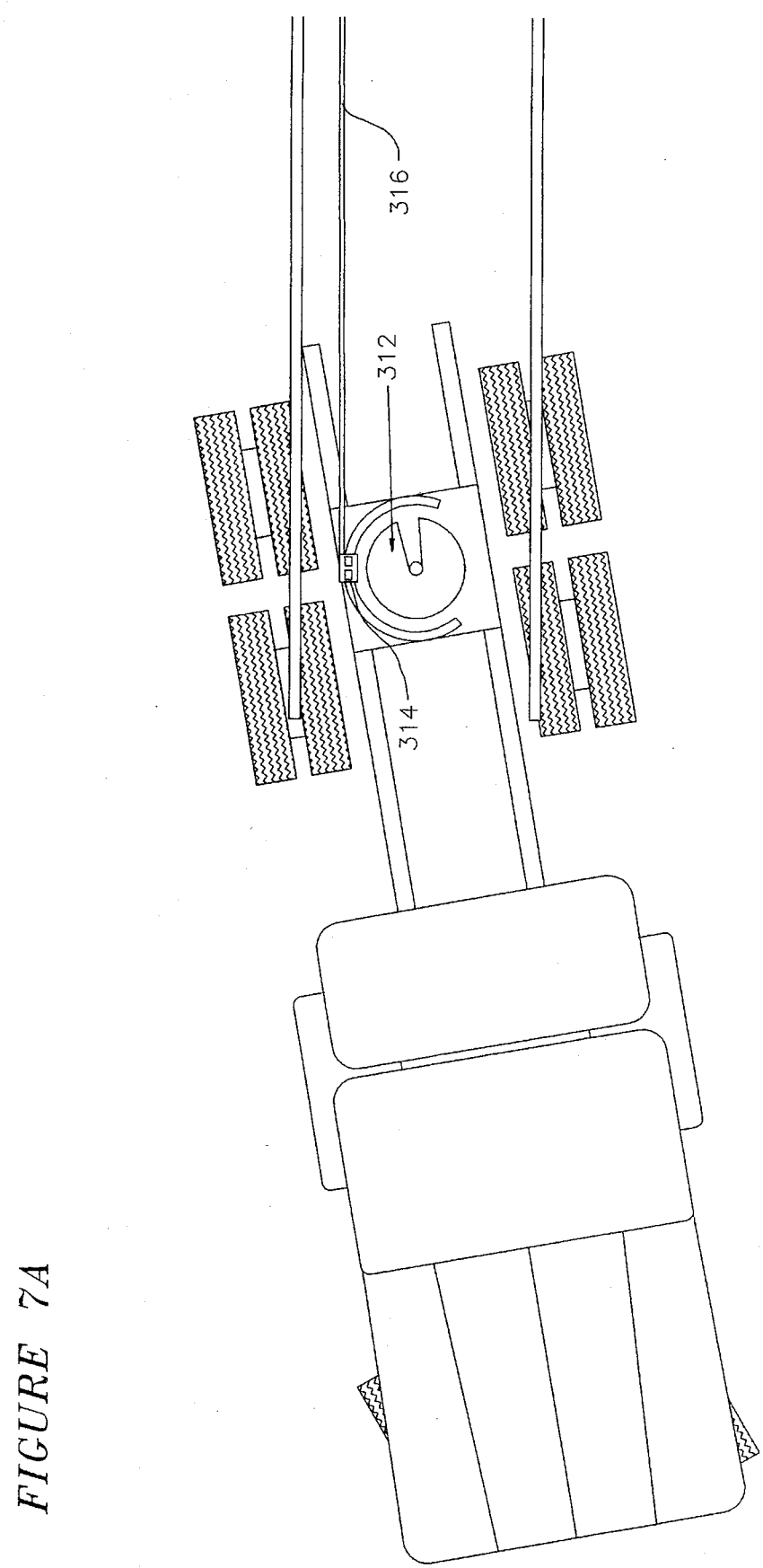
FIG. 7A is a top view of the front portion of a trailer assembly showing its use with a towing cab.
Figure 7B:
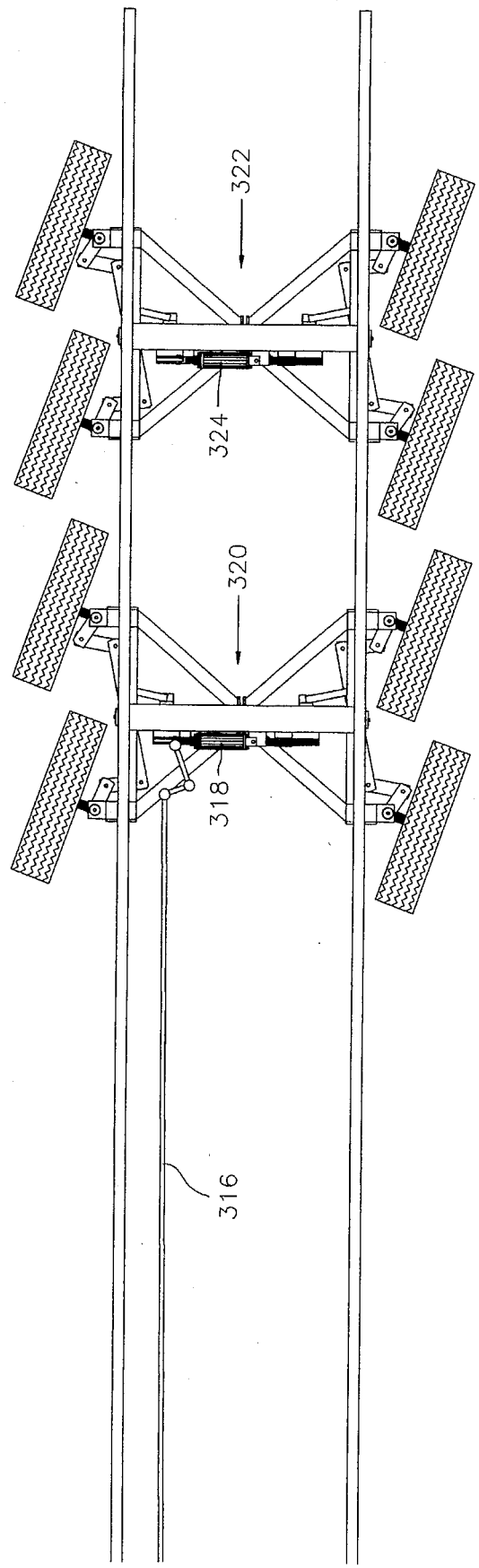
FIG. 7b is a top plan view of the rear portion of the trailer assembly.

Turning to FIGS. 7a and 7b, there is illustrated an embodiment wherein a cab 310 is attached to a trailer by means of a fifth wheel arrangement generally designated by reference numeral 312.

Mounted on fifth wheel 312 is a sensor 314 which through line 316 communicates with a cylinder 318 of a first rear dolly 320. In turn, this dolly would communicate with a second dolly 322 to operate cylinders 318 and 324 in response to the turning sensed through sensor 314. In this respect, many different types of sensors can be used including various electronic sensors to measure the degree of rotation of the two portions of the fifth wheel assembly to thereby provide a suitable signal to the rear dollies to allow the proper amount of turning. The controls could be electronic and/or mechanical or combinations thereof.

It will be understood that the above described embodiments are for purposes of illustration only and that changes and modifications may be made thereto without departing from the spirit and scope of the invention.

What is claimed is:

1. A dolly steering assembly comprising a pair of opposed front rotatably mounted front wheels, a pair of opposed rotatably mounted rear wheels, a frame means interconnecting said front and rear wheels, a transversely extending shaft associated with said frame means, steering linkage means operatively associated with each wheel, at least one steering control arm associated with each set of a front wheel and a rear wheel, a first end of said steering control arm being operatively connected to said steering linkage means to turn said each set of a front wheel and a rear, wheel, a second end of said steering control arm being both slidably and rotatably mounted on said transversely extending shaft such that said steering control arm may move transversely along said shaft to turn said wheels and also permit rotatable movement thereof to thereby allow relative vertical movement of said front and rear wheels.

2. The steering assembly of claim 1 wherein said steering linkage means associated with each of said sets of wheels includes a connecting member extending between the steering linkage means of a front and a rear wheel, said connecting member being pivotably mounted on said frame means, said first end of said steering control arm being pivotably connected to said connecting member to cause pivoting movement of said connecting member to effect steering of said wheels.

3. The steering assembly of claim 1 wherein each of said wheels has a steering control arm operatively connected to said steering linkage.

4. The steering assembly of claim 1 wherein each of said wheels is rotatably mounted on a spindle, said spindle being operatively mounted on said frame means, said steering linkage including a first arm fixedly secured to said spindle to cause turning of said wheel, a second arm pivotably connected to said first arm, and a connecting member interconnecting said second arms of a front and rear wheel, said connecting arm being pivotably connected to said frame, said steering control arm being operatively connected to said connecting member.

5. The steering assembly of claim 1 further including hydraulic drive means operatively connected to said steering control arm such that operation of said hydraulic drive means will cause said steering control arm to move transversely along said shaft to thereby turn said wheels.

6. A steering assembly comprising a left front wheel, a right front wheel, a rear left wheel, and a rear right wheel, each wheel being rotatably mounted on a spindle, a dolly frame interconnecting said wheels, said spindles being mounted on said dolly frame, each of said wheels having steerage linkage means operatively associated therewith for turning said wheels, a first connecting member extending between said steering linkage means of said left wheels and a second connecting member extending between steering linkage means of said right wheels, said connecting members each being pivotably mounted with respect to said frame, and a steering control arm associated with each connecting member and being pivotably connected with respect to said connecting member to cause said connecting member to move and thereby control movement of said wheels.

7. The steering assembly of claim 6 further including hydraulic cylinder means operatively connected to said dolly frame and said steering control arm.

8. A trailer assembly having a front dolly and a rear dolly, frame means interconnecting said front and rear dollies, each of said dollies having:

a pair of opposed front rotatably mounted wheels, a pair of opposed rear rotatably mounted wheels, a sub-frame interconnecting the front and rear wheels, said sub-frame being pivotably connected to the frame means, a transversely extending shaft associated with said sub-frame, steering linkage means operatively associated with each wheel and at least one steering control arm associated with each set of a front wheel and a rear wheel comprised of a front wheel and a rear wheel, a steering control arm being operatively connected to said steering linkage means of each wheel, and means interconnecting the front and rear dollies such that the control arms of one of the dollies are actuated in response to movement of the control arms of the other of said dollies.

9. The trailer assembly of claim 8 wherein said means interconnecting the front and rear dollies are hydraulic means.

* * * * *